(12) United States Patent
McCarthy

(10) Patent No.: US 7,659,326 B2
(45) Date of Patent: Feb. 9, 2010

(54) ANTIMICROBIAL PAINT

(75) Inventor: Benjamin James McCarthy, Leeming (AU)

(73) Assignee: Beyond Technologies Australia Pty Ltd., East Fremantle, West Australia (AU)

(*) Notice: Subject to any disclaimer, the term of this patent is extended or adjusted under 35 U.S.C. 154(b) by 284 days.

(21) Appl. No.: 11/328,682

(22) Filed: Jan. 9, 2006

(65) Prior Publication Data

US 2007/0161723 A1    Jul. 12, 2007

(51) Int. Cl.
*C09D 5/16* (2006.01)
*C08K 5/34* (2006.01)
*C08K 5/3435* (2006.01)

(52) U.S. Cl. .......................... 523/122; 524/99; 524/102
(58) Field of Classification Search .................. 523/122; 524/99, 102
See application file for complete search history.

(56) References Cited

U.S. PATENT DOCUMENTS

| | | | |
|---|---|---|---|
| 4,167,512 A | 9/1979 | Lai | |
| 4,190,571 A | 2/1980 | Lai et al. | |
| 4,207,228 A | 6/1980 | Lai et al. | |
| 4,240,961 A | 12/1980 | Lai | |
| 4,246,412 A | 1/1981 | Lai | |
| 4,292,240 A | 9/1981 | Lai et al. | |
| 4,297,497 A | 10/1981 | Lai | |
| 4,415,684 A | 11/1983 | Lai et al. | |
| 4,466,915 A | 8/1984 | Lai | |
| 4,480,092 A | 10/1984 | Lai et al. | |
| 4,547,538 A | 10/1985 | Lai et al. | |
| 4,629,752 A | 12/1986 | Layer et al. | |
| 4,639,478 A | 1/1987 | Haas et al. | |
| 4,929,653 A | 5/1990 | Kletecka et al. | |
| 5,354,795 A | 10/1994 | Ueno et al. | |
| 6,207,290 B1* | 3/2001 | Blum et al. | 428/540 |

* cited by examiner

*Primary Examiner*—Kriellion A Sanders
(74) *Attorney, Agent, or Firm*—Duane Morris LLP

(57) ABSTRACT

The present invention provides an antimicrobial paint including an effective amount of one or more UV light absorbers. The UV light absorber can be any UV light absorber able to prevent or reduce a change or destructive effect by UV light on a metal pyrithione, but is preferably a benzotriazole UV light absorber or a hindered amine light stabilizer ("HALS").

10 Claims, 4 Drawing Sheets

ANTIMICROBIAL PAINT

FIELD OF THE INVENTION

The present invention relates to an antimicrobial paint. In particular, the present invention relates to an antimicrobial paint comprising an effective amount of a UV light stabilizer.

BACKGROUND OF THE INVENTION

Paints are typically liquids, which are useful for application to a substrate, such as wood, metal, glass, ceramics, fiberglass, composite materials, cardboard, corrugated board, paper, textiles, non-woven materials, plastic, foam, tape or a combination thereof, in a thin layer. Paints are typically used to protect the surface of the substrate from elemental damage and/or physical damage. They are also commonly used for decoration and aesthetic purposes, and find very broad commercial use as well as a variety of uses in the home. Paints, their formulations, ingredients, additives and processing conditions are generally described in Kirk-Othmer-Paint; pg. 1049-1069, Vol. 17; 1996, by Arthur A. Leman, the disclosure of which is incorporated herein in its entirety.

For many years, there has been a need in the paint industry for a paint that is capable of preventing growth of microbes, such as mould and bacteria, on walls and other painted surfaces. Indoors, moulds can be a health hazard as well as an aesthetic problem. Additionally, a paint that has antibacterial qualities would be desirable, especially in hospitals, kitchens, and meat processing rooms. Until now, it has been difficult to produce a paint with anti-microbial activity which also has low toxicity to humans.

A number of paints claim to have anti-bacterial, anti-fungal, anti-yeast and/or anti-viral activity. However, many of these paints suffer from associated problems that either affect their visual appeal and/or create potential toxicological health hazards. For example, metal pyrithione compounds, such as zinc pyrithione, have been used in latex paint as long lasting anti-fungal compounds with low human toxicity. However, it is well known in the paint manufacturing industry that the effective amount of zinc pyrithione is approximately 0.5% v/v, but greater than about 0.4% v/v is very difficult to mix into typical paint bases or binders. Moreover, zinc pyrithione is sensitive to ultraviolet light and consequently tends to experience loss of its antimicrobial properties upon exposure to sunlight. Furthermore, zinc pyrithione yellows after a period of time in the presence of sunlight, which affects the color of a paint in which it is present.

The present invention relates to an antimicrobial paint that overcomes or at least alleviates some of the problems associated with so-called antimicrobial paints previously in use.

SUMMARY OF THE INVENTION

In accordance with the present invention, it has been discovered that the inclusion in a paint of a UV light absorber, which prevents or reduces a change or destructive effect by UV light on a metal pyrithione, facilitates the ability of the metal pyrithione to dissolve in a paint base, and therefore higher concentrations of the metal pyrithione in the paint can be obtained.

Accordingly, the present invention provides an antimicrobial paint comprising an effective amount of one or more UV light absorbers.

The UV light absorber can be any UV light absorber able to prevent or reduce a change or destructive effect by UV light on a metal pyrithione, but is preferably a benzotriazole UV light absorber or a hindered amine light stabilizer ("HALS"). Where the UV light absorber is a HALS, the HALS preferably has a molecular weight of more than 500. More preferably, the HALS, or a salt, derivative, or polycondensate thereof, has a piperazine moiety and/or a piperidine moiety. Where the HALS has a piperazine moiety this is preferably a piperazinone moiety.

In a preferred embodiment, the hindered amine light stabilizer is selected from one or more of the group consisting of dimethyl succinate-1-(2-hydroxyethyl)-4-hydroxy-2,2-6,6-tetramethylpiperidine polycondensation product, 1,2,3,4-butanetetracarboxylic acid-2,2,6,6-tetramethyl-4-piperidinol tridecyl alcohol condensation product, 1,2,3,4-butanetetracarboxylic acid-1,2,2,6,6-pentamethyl-4-piperidinol tridecyl alcohol condensation product, poly[[{6-(1,1,3,3-tetramethylbutyl)imino-1,3,5-triazine-2,4-diyl-}-{2,2,6,6-tetramethyl-4-piperidyl-) imino}]hexamethylene{2,2,6,6-tetramethyl-4-piperidyl) imino}], 2-(3,5-di-tert-butyl-4-hydroxybenzyl)-2-n-butyl-malonic acid-bis(1,2,2,6,6-pentamethyl-4-piperidyl), tetrakis(2,2,6,6-tetramethyl-4-piperidyl)-1,2,3,4-butanetetracarboxylate, tetrakis(1,2,2,6,6-pentamethyl-4-piperidyl)-1,2,3,4-butanetetracarboxylate, bis(1,2,2,6,6-pentamethyl-4-piperidyl) sebacate, and 1-[2-[3-(3,5-di-tert-butyl-4-hydroxyphenyl)propionyloxy]ethyl]-4[3-(3,5-d-1-tert-butyl-4-hydroxyphenyl)propionyloxy]-2,2,6,6-tetramethylpiperidine, 1,2,2,6,6-penta methyl-4-piperidyl/tridecyl, and 2,2,6,6-tetramethyl-4-piperidyl/tridecyl. More preferably, the HALS is a hydroxyphenyl-benzotriazole derivative, bis(1,2,2,6,6-pentamethyl-4-piperidyl) sebacate and/or methyl(1,2,2,6,6-pentamethyl-4-piperidyl) sebacate. Even more preferably, the HALS is one or more of bis(1,2,2,6,6-pentamethyl-4-piperidinyl)sebacate (Cas: 41556-26-7), or bis(1,2,2,6,6-pentamethyl-4-piperidinyl) (3,5-di-tert-butyl-4-hydroxybenzyl)butylpropanedioate (CAS number unknown), and methyl 1,2,2,6,6-pentamethyl-4-piperidinyl sebacate. (Cas: 82919-37-7). More preferably, the HALS is bis(1,2,2,6,6-pentamethyl-4-piperidinyl)sebacate (Cas: 41556-26-7) in combination with methyl 1,2,2,6, 6-pentamethyl-4-piperidinyl sebacate.

Preferably, the HALS is 50% bis(1,2,2,6,6-pentamethyl-4-piperidinyl)sebacate (Cas: 41556-26-7) and 50% methyl 1,2, 2,6,6-pentamethyl-4-piperidinyl sebacate. More preferably, the HALS is 80% bis(1,2,2,6,6-pentamethyl-4-piperidinyl) sebacate (Cas: 41556-26-7) and 20% methyl 1,2,2,6,6-pentamethyl-4-piperidinyl sebacate.

The amount of HALS used depends upon the end use of the paint. Preferably, the amount of HALS is between about 0.5% v/v to about 5% v/v; more preferably, between about 1% v/v to about 3.5% v/v. Most preferably, the amount of HALS is between about 1.5% v/v to about 3% v/v.

Preferably, the metal pyrithione is zinc pyrithione or copper pyrithione. More preferably, the metal pyrithione is zinc pyrithione.

Preferably, the antimicrobial paint further comprises one or more metal oxides. The amount of the metal oxide used will depend upon the type of the metal oxide and the end use of the paint. Preferably, the amount of the metal oxide is less than 2% v/v. More preferably, the amount of the metal oxide is between about 0.5% v/v to about 1.5% v/v. Most preferably, the amount of the metal oxide is between about 0.8% v/v to about 1% v/v. Preferably, greater than 90% of the particles of the metal oxide are less than 2 µm. More preferably, greater than 95% of the particles of metal oxide are less than 1 µm. Most preferably, the amount of the metal oxide is between about 0.8% wt/v to about 1.2% wt/v, and 90% of the particles have a size less than about 1 µm.

Preferably, the metal oxide is selected from the group consisting of aluminium oxide, silicon dioxide, ferric 8% to 18% oxide, sodium oxide, zirconium oxide, beryllium oxide, manganese oxide, zinc oxide, titanium oxide or tantalum oxide. More preferably, the metal oxide is a zinc oxide or a sodium oxide. Most preferably, the metal oxide is a zinc oxide.

In a further aspect of the present invention, there is provided an antimicrobial paint comprising:

(a) one or more HALS(s) at between about 0.5% v/v to about 5% v/v; and (b) zinc oxide at between about 0.5% v/v to about 1.5% v/v.

The antimicrobial paint may further comprise (c) sodium oxide at between about 0.5% v/v to about 1.5% v/v.

In a further aspect the present invention provides a method of manufacturing an antimicrobial paint, comprising mixing one or more UV light-absorber(s), such as one or more HALS(s), together with a suitable liquid vehicle comprising a metal pyrithione.

In a further aspect the present invention provides a painted article, wherein the article is painted with an antimicrobial paint comprising one or more UV light stabilizers, such as one or more HALS(s).

DETAILED DESCRIPTION OF THE INVENTION

Figure 1:
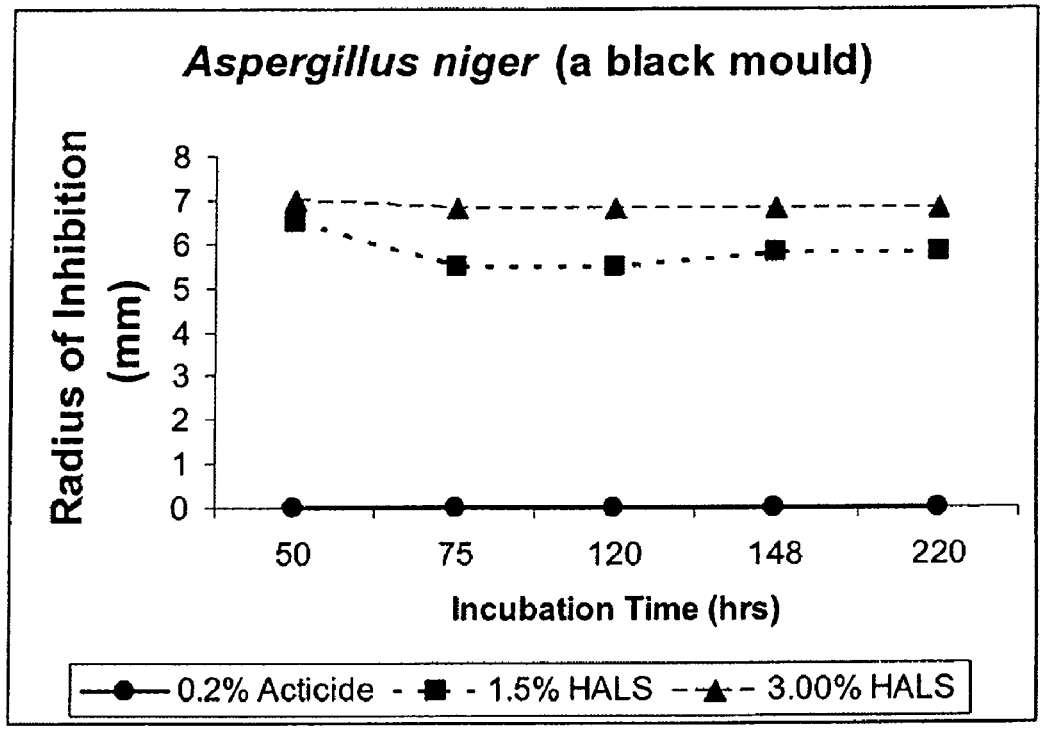
FIG. 1 summarizes the inhibition of *A. niger* growth by the test paint over a 9 day period. Each data-point of a line represents the mean (average) of two repeats of a test. The amount of HALS in respective paints is shown in the associated legend.

Before describing the present invention in detail, it is to be understood that this invention is not limited to particularly exemplified methods and may, of course, vary. It is also to be understood that the terminology used herein is for the purpose of describing particular embodiments of the invention only, and is not intended to be limiting which will be limited only by the appended claims.

All publications, patents and patent applications cited herein, whether supra or infra, are hereby incorporated by reference in their entirety. Furthermore, the practice of the present invention employs, unless otherwise indicated, conventional chemistry and microbiological techniques within the skill of the art. Such techniques are well known to the skilled worker, and are explained fully in the literature. See, eg., Kirk-Othmer-Paint; pg. 1049-1069, Vol. 17; 1996, by Arthur A. Leman; Surface Coatings Textbook: Volume I & II a Surface Coatings Association Australia Publication; "European Coatings Handbook", 2000, Ed P. Mischke, M. Groteklaes, & T. Brock, Vincentz Press; "Protective Coatings: Fundamentals of Chemistry and Composition", 1994, by Clive H Hare.

It must be noted that as used herein and in the appended claims, the singular forms "a," "an," and "the" include plural reference unless the context clearly dictates otherwise. Thus, for example, a reference to "a paint" includes a plurality of paints, and a reference to "an additive" is a reference to one or more additives, and so forth. Unless defined otherwise, all technical and scientific terms used herein have the same meanings as commonly understood by one of ordinary skill in the art to which this invention belongs. Although any materials and methods similar or equivalent to those described herein can be used to practice or test the present invention, the preferred materials and methods are now described.

The present invention relates to an antimicrobial paint. As used herein, the term "antimicrobial paint" refers to a paint comprising a metal pyrithione and having the ability to inhibit or irreversibly prevent the growth of a microorganism. A microorganism may be bacterium, mould, yeast, or fungus. Such inhibition or prevention can be through a microbiocidal action or microbiostatic inhibition.

The term "microbiocidal inhibition" or "inhibition of microbial growth" as used herein refers to the ability of the antimicrobial paint of the present invention to kill, or irrevocably damage the target microorganism. The term "microbiostatic inhibition" as used herein refers to the inhibition of the growth of the target organism without death. "Microbiocidal" or "microbiostatic" inhibition can be applied to a surface either presently exhibiting microbial growth (i.e., treating a contaminated surface) or a surface at risk of sustaining or supporting such growth (i.e., prevention of contamination).

The term "paint" as used herein is intended to encompass a mixture of resin, pigment, and a suitable liquid vehicle that is reasonably fluid and provides a thin and adherent coating when applied to a substrate. As such, the term "paint" is intended to encompass paints, lacquers, varnishes, base coats, clear coats, primers and the like.

As used herein, the term "metal pyrithione" means a compound having the formula shown below as Formula I:

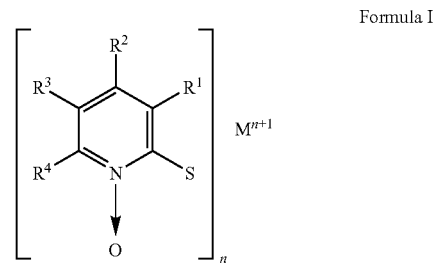

Formula I wherein each of $R_1$ to $R_4$ independently represents a hydrogen atom, an alkyl group, an alkoxy group or a halogenated alkyl group; M represents a metal such as Cu, Zn, Na, Mg, Ca, Ba, Pb, Fe or Al; and n is a valence, and further include tetramethylthiuram disulfide, carbamate compounds (e.g., zinc dimethyldithiocarbamate and manganese 2-ethylenebisdithiocarbamate), 2,4,5,6-tetrachloroisophthalonitrile, N,N-dimethyldichlorophenylurea, 4,5-dichloro-2-n-octyl-3(2H)isothiazoline, 2,4,6-trichlorophenylmaleimide and 2-methylthio-4-t-butylamino-6-cyclopropyl-s-triazine.

Of the above organic antimicrobial agents, one or more of copper pyrithione (in the Formula I, M=Cu), zinc pyrithione (in the Formula I, M=Zn), N,N-dimethyldichlorophenylurea, 2,4,6-trichlorophenylmaleimide, 2-methylthio-4-t-butylamino-6-cyclopropyl-s-triazine, 4,5-dichloro-2-n-octyl-4-isothiazolin-3-one and 2,4,5,6-tetrachloroisophthalonitrile are preferred. Zinc pyrithione is most preferred.

Metal pyrithiones, such as zinc pyrithione, typically do not readily mix or dissolve homogeneously in a paint mixture. However, according to the present invention, the addition of a UV light absorber to the paint mixture improves the dispersion of the metal pyrithione through the paint.

As used herein, a "UV light absorber", such as a benzatriazole UV light absorber or a HALS, is an agent which prevents or reduces a change or destructive effect of an organic material, such as a metal pyrithione, by UV light.

In one embodiment, the antimicrobial paint of the invention comprises an effective amount of one or more HALS(s). The term "HALS", or a salt, derivative, or polycondensate thereof, as used herein refers to compounds comprising a piperazine moiety and/or a piperidine moiety. Where the HALS has a piperazine moiety, this is preferably a piperazinone moiety. Details for the preparation of numerous hindered amines containing PSP unit are disclosed in U.S. Pat. Nos. 4,167,512; 4,190,571; 4,207,228; 4,240,961; 4,246,412; 4,297,497; 4,292,240; 4,297,497; 4,415,684; 4,466,915; 4,480,092; 4,547,538; 4,629,752 and 4,639,478; inter alia, the disclosures of which are incorporated by reference thereto as if fully set forth herein.

HALS per se are well known in the art and have been used extensively to protect propylene homopolymers or copolymers against degradation due to irradiation with electromagnetic energy in the visible light spectrum in the presence of an oxidising environment. In accordance with the present invention, it has been discovered that HALS also have use in the prevention against or reduction of degradation of metal pyrithiones due to irradiation with UV light.

HALS useful in the present invention are disclosed in, e.g., U.S. Pat. No. 4,929,653 to Kletecka et al. and U.S. Pat. No. 5,354,795 to Ueno et al. both of which are incorporated herein by reference. Kletecka et al. discloses the treatment of polypropylene used in making polypropylene fibers to be used in making yarn and fabric through the application of a hindered amine light stabilizer. The stabilizers are incorporated into the propylene in the course of the extrusion and spinning operation involved in the formation of the fibers. Disclosed in Kletecka are a wide variety of HALS containing as a portion of their basic structure a polysubstituted piperazine-2-one (PSP) unit.

Ueno et al. discloses the use of HALS in combination with anti-oxidants, thermal stabilizers, ultraviolet stabilizers and the like in formulating polypropylene resin compositions having good weathering characteristics, and are useful in automobile parts, such as bumpers and the like. In Ueno, the stabilizer is characterized as a HALS having a molecular weight of 500 or more or having a molecular weight of less than 500 and not having an N—H bond. Examples given in Ueno et al. of HALS having a molecular weight of more than 500 include dimethyl succinate-1-(2-hydroxyethyl)-4-hydroxy-2,2-6,6-tetramethylpiperidine polycondensation product, 1,2,3,4-butanetetracarboxylic acid-2,2,6,6-tetramethyl-4-piperidinol tridecyl alcohol condensation product, 1,2,3,4-butanetetracarboxylic acid-1,2,2,6,6-tetramethyl-4-piperidinol tridecyl alcohol condensation product, poly[[{6-(1,1,3,3-tetramethylbutyl)imino-1,3,5-triazine-2, 4-diyl-}-{2,2,6,6-tetramethyl-4-piperidyl-)imino}]hexamethylene {2,2,6,6-tetramethyl-4-piperidyl)imino}], 2-(3,5-di-tert-butyl-4-hydroxybenzyl)-2-n-butyl-malonic acid-bis(1,2,2,6,6-pentamethyl-4-piperidyl), tetrakis(2,2,6,6-tetramethyl-4-piperidyl)-1,2,3,4-butanetetra carboxylate, tetrakis(1,2,2,6,6-pentamethyl-4-piperidyl) -1,2,3,4-butanete-tricarboxylate, bis(1,2,2,6,6-pentamethyl-4-piperidyl) sebacate, and 1-[2-[3-(3,5-di-tert-butyl-4-hydroxyphenyl)propionyloxy]ethyl]-4[3-(3,5-d-1-tert-butyl-4-hydroxyphenyl)propionyloxy]-2, 2,6,6-tetramethylpiperidine. A hindered amine light stabiliser having a molecular weight of less than 500 and not having an N—H bond is identified as 8-benzyl-7,7,9,9-tetra-thyl-3-octyl-1,3,8-triazaspiro[4,5]undecane-2,4-dione.

Accordingly, in one embodiment of the present invention the paint comprises one or more HALS(s). More preferably, the HALS, or a salt, derivative, or polycondensate thereof, has a piperazine moiety and/or a piperidine moiety. Where the HALS has a piperazine moiety, this is preferably a piperazinone moiety.

Once the appropriate HALS have been identified, they are then generally mixed into an appropriate vehicle, such as a solvent and/or binder, to produce an effective amount of HALS. The term "effective amount" is an amount of one or more HALS(s) sufficient to produce a paint comprising at least about 0.4% v/v zinc pyrithione. Preferably the paint comprises at least about 0.5% v/v zinc pyrithione. More preferably, the paint comprises more than 0.5% v/v zinc pyrithione. In one embodiment, the amount of hindered amine light stabilizer used is between about 0.5% v/v to about 5% v/v of suitable vehicle; more preferably, between about 1% v/v to about 3.5% v/v of suitable vehicle. Most preferably, the amount of hindered amine light stabilizer is between about 1.5% v/v to about 3% v/v of suitable vehicle.

The vehicle for the paint may be aqueous or organic. The choice of vehicle will depend upon the conditions that the paint will encounter. For example, if the paint will be exposed to outdoor conditions, or if the coating will be exposed to repeated washings, then an organic solvent, such as petroleum, or binder may be preferred. Binders which may be used in a paint of the invention include urethane and synthetic binders, natural oil and casein binders, and acrylic and vinyl acetate binders. Preferred binders include cellulose derivatives selected from the group consisting of an alkyl derivative, a hydroxyl derivative, and a carboxyl derivative. Most preferred binders are ethylcellulose and hydroxy propylmethyl cellulose.

The amount of vehicle used to make the paint is dependent upon the method of application desired. Preferably, the vehicle should be used in an amount sufficient to make the paint a spreadable fluid. The antimicrobial paint should have a consistency which is flowable for application, and the formula should permit the antimicrobial paint to dry over a reasonable period of time, preferably no longer than overnight. Preferably, the antimicrobial paint of the present invention is applied to a thickness of between about 2-5 mm; however, the antimicrobial paint may have any desired thickness, as long as the antimicrobial paint is durable and adhesive.

Preferred additional components for the paint will vary depending upon the type of vehicle system used. Therefore, water-based paints and organic-based paints are separately described below.

Water-Based Paints

Water-soluble binders that are suitable for use in the present invention include, but are not limited to water-soluble polyalkylene oxides and hydroxylated or carboxylated cellulose-derived polymers, including, but not limited to salts of cellulosic acids and carboxyalkyl-derivatives of cellulose, such as carboxyethylcellulose, carboxymethylcellulose, and carboxyhydroxycellulose. A preferred cellulose-derived polymer is hydroxy propylmethyl cellulose, most preferably Grade E5, available from Dow Chemical Co. A preferred polyalkylene oxide is Polyox™ Grade N-80, which is available from Union Carbide. Water soluble polyethylene glycols, such as the CARBOWAX™ variety, available from Dow Chemical Co. and Union Carbide, are also suitable as water-soluble binders for use in the present invention.

A water-based antimicrobial paint of the invention preferably contains a humectant in order to draw water and water vapor into the paint and to stabilize the water content of the paint. Suitable humectants for a water-based coating include, but are not necessarily limited to, water soluble glycols, such as glycerol, polyethylene glycol and tripropylene glycol. A preferred humectant for water-based paints is glycerol.

Preferably, a water-based antimicrobial paint of the invention contains a plasticizer to facilitate processing and to increase the flexibility and toughness of the final product. Plasticizers are believed to "solvate" the polymer molecules in the paint. Suitable plasticizers for water-based paints also may serve as humectants, and include but are not necessarily limited to glycerol and polyols, such as polyethylene glycol and its derivatives. A preferred water-soluble plasticizer is glycerol.

Organic-Based Paints

Suitable binders that are soluble in organic solvents include, but are not limited to, cellulose-derived polymers, including but not necessarily limited to, alkyl celluloses, cellulose ethers, esters of cellulose, such as cellulose acetate and cellulose butyrate. A preferred binder for use in organic solvents is ethylcellulose. Polyethylene glycols which are soluble in an organic solvent also could be used as binders in organic base paints.

The organic solvent system should have a controllable drying rate to avoid shrinkage or cracks. An organic-based paint preferably should comprise between about 2-20 wt % humectant, preferably between about 5-15 wt % humectant. Suitable humectants include organically soluble polyalkylene glycols. A preferred humectant for an organic-based paint is propylene glycol.

Suitable plasticizers for organic-based paints include, but are not necessarily limited to, non-volatile organic liquids and low-melting solids, such as phthalate, adipate, and sebacate esters, tricresyl phosphate, castor oil, and the like. A preferred plasticizer is propylene glycol, which also serves as a humectant.

Components Useful in Any Solvent Systems

Some of the components of the paint may be used in either a water-based or an organic-based paint. For example, a filler may be added to extend the antimicrobial paint and to provide inherent structure to the paint to reduce shrinkage and peeling, and to leave a continuous coating after the moisture evaporates. Suitable fillers for use with either solvent system include, but are not necessarily limited to, calcium carbonate, barium sulfates, silicates, glass spheres, hollow microspheres, silica flour, clays, talc, volcanic ash, fly ash, slag, titania, and the like. A preferred filler is calcium carbonate.

Pigment or opacifier may be added to opacify or add color to the paint. Suitable pigments/opacifiers for use with any of these solvent systems include, but are not necessarily limited to, calcium carbonate, titanium oxide, carbon black, chromium oxide, and iron oxide. Preferred opacifiers are calcium carbonate, which also acts as a filler, and titanium oxide, which also acts as a whitening agent. The pigment/opacifier may be about 5-10 parts by weight of the paint.

Ionic and/or non-ionic surfactants of the wetting agent, detergent, or emulsifier type also may be used to reduce the surface tension and to increase the efficiency of the paint in wetting its ingredients during blending. Suitable surfactants and detergents for use with any of these solvent systems include, but are not necessarily limited to, sodium alkyl and aryl sulfonates (anionic), alkyl phenol ethers of polyethylene glycol (non-ionic), and various cationic agents. Preferred surfactants are Dupanol ME, available from Dupont, Tergitol™ and Tergitol 15S70, both of which are available from Union Carbide, or Triton X-100, available from Rohm & Haas.

An anti-foaming or defoaming agent also may be added to an antimicrobial paint of the invention. Suitable anti-foaming agents for use with any of these solvent systems include, but are not necessarily limited to, sulfonated oils, organic phosphates, silicone fluids, dimethylpolysiloxanes, and the like. Preferred anti-foaming agents are Dow Corning Anti-foam Agent DB-31, SG-10, 1510US, 544 compound, DB110A, and similar anti-foaming agents, all of which are commercially available from Dow Corning. A most preferred anti-foaming agent is SG-10, available from Dow Corning.

In the paint industry, considerable latitude is taken to affect paints or coatings of varied textures, colors, and luster or flat appearance. Such practice can be applied to these basic recipes without altering their antimicrobial performance and their durability. Preferably the recipes do not transcend the UV light stabilizer to binder ratios and pigment to binder ratios expressed within the ranges provided herein. These ranges provide latitude in the practice of preferred paint, texture, color, and application techniques.

Some concern exists that water-based paints might be less durable than organic-based paints over the long term because of repeated washing, wiping, etc. One way to prolong the life of substantially any water-based paint is to provide a separate protective film comprising one of the non-water soluble, or organically soluble binders known in the art over the top of the antimicrobial paint described herein. This protective film may also comprise a metal pyrithione and a UV light absorber, and may therefore be antimicrobial.

In a preferred embodiment, the protective film comprises between about 5-15 wt % of a non-water soluble cellulose-derived polymer dissolved in between about 85-95 wt % of an appropriate organic solvent, preferably a volatile organic solvent. The protective film preferably should be sprayed or otherwise deposited in a fine mist over the water-base paint to provide adequate coverage and protection of the paint.

The invention will now be further described by way of reference only to the following non-limiting examples. It should be understood, however, that the examples following are illustrative only, and should not be taken in any way as a restriction on the generality of the invention described above. In particular, while the invention is described in detail in relation to the use of a specific HALS, it will be clearly understood that the findings herein are not limited to this HALS compound.

EXAMPLE 1

Manufacture of Hals-Containing Paint

An antimicrobial paint containing HALS was made by combining bis(1,2,2,6,6-pentamethyl-4-piperidinyl)sebacate and methyl(1,2,2,6,6-pentamethyl-4-piperidinyl)sebacate at a ratio of 1:4 to give a total HALS concentration of 1.50% v/v or 3% v/v to a standard water-based paint comprising zinc pyrithione at a concentration from 0.2-3.0%. The HALS was mixed into the paint using a paint shaker.

EXAMPLE 2

Antimicrobial Properties of a Hals-Containing Antimicrobial Paint

The antimicrobial properties of the paints from Example 1, containing 1.5% v/v or 3% v/v HALS and zinc pyrithione in an approximately 50:50 ratio, were compared with a standard water-based paint to which 0.2% v/v Acticide was added. Acticide is a preservative used in paint; however Government regulations state that Acticide is not permitted in paints at a concentration any higher than 0.2% v/v. 0.2% v/v Acticide is known to have relatively short-lasting anti-fungal activity.

Each paint was tested against a mould (*Aspergillus niger*), a yeast (*Candida albicans*), a Gram positive bacterium (*Staphylococcus aureus*) and a Gram negative bacterium (*Escherichia coli*).

*Aspergillus niger* was chosen as it is a typical house-mould, which can also be allergenic. *Candida albicans* (thrush) was included as a representative of a yeast that causes disease. *S. aureus* and *E. coli* are bacterial species that are medically and hygienically important, however many known biocides that are active against one of these superfamilies are often not as active against the other superfamily.

The method chosen for testing the efficacy of antimicrobial paint was developed at the Department of Microbiology, University of Sydney, NSW Australia, by analogy to other standard disc diffusion tests. The method involves the assumption that the antimicrobial agents in these paints will exert their effects by diffusing or leaching slowly out of the paint and into contact with a subject micro-organism. Most antimicrobial paint additives work in this fashion.

*A. niger* lawns were prepared by swabbing a 1 in 10 dilution of a spore suspension (in water) onto a Sabouraud Dextrose (SD) Agar plate comprising peptone 10 g/L, glucose 40 g/L and agar 15 g/L. The spores used had also been raised on SD Agar medium, from which they were scraped and transferred to sterile distilled water to make the suspension.

*C. albicans* lawns were prepared by swabbing an approx. 40 hour culture (raised in Yeast Broth [YB] at 37° C.) onto a YB agar plate. Yeast Broth comprises D-Glucose 20 g/L, tryptone 2 g/L, and yeast extract 5 g/L.

*S. aureus* lawns were prepared by swabbing an overnight culture (raised in Luria Bertani [LB] medium at 37° C.) onto an LB agar plate. LB medium is 10 g tryptone, 5 g Yeast extract and NaCl 10 g/L. LB agar is LB containing 15 g agar per liter.

*E. coli* lawns were prepared by swabbing an overnight culture (raised in LB medium at 37° C.) onto an LB agar plate.

To test the antimicrobial effect of the paints of the invention compared with the Acticide-containing paint, inert filter discs (Millipore) were covered with each of the paints and allowed to dry at 56° C. for at least half an hour. Each painted disc was then placed upside down onto solidified (gelled) nutrient agar media that had been previously coated with a lawn of one of the test microorganisms.

All paint antimicrobial efficacy tests were incubated at 37° C. These tests simulated 10 years exposure to UV light in accordance with American Society of Testing and Materials (ASTM) standard G155.

The results of the paints of the invention and the Acticide-containing paint were observed on test plates having *A. niger* or *C. albicans* lawns after four days incubation, and plates having *E. coli* or *S aureus* lawns after two days incubation. Prior to recording the results by photography, and thereafter during continued incubation, zones of growth inhibition around the painted discs were measured. Measurements continued for a period of up to 9 days and are shown graphically in FIGS. 1, 2, 3 and 4.

It can be seen from FIG. 1 that *A. niger* was inhibited by paint that contained either 1.5% v/v HALS and zinc pyrithione or 3% v/v HALS and zinc pyrithione. After 48 h of incubation the 3% v/v HALS and zinc pyrithione showed a marginally greater antimicrobial effect than that containing 1.5% v/v HALS and zinc pyrithione, but not twice the effect. The control paint containing 0.2% Acticide produced no zone of growth inhibition for *A. niger*. The genus Aspergillus includes some typical household moulds, and includes some toxigenic species, so this organism is regarded as a suitable model for antimicrobial paint tests. The results with *A. niger* confirm our expectation that 1.5% v/v HALS and zinc pyrithione will be sufficient to achieve sustainable and active inhibition of fungal growth by paint. The zone of mould growth inhibition around the 3% v/v HALS and zinc pyrithione disc was larger than that around the 1.5% HALS and zinc pyrithione disc, but was not twice as large. Therefore, paint containing 1.5% v/v HALS and zinc pyrithione is capable of controlling moulds.

Figure 2:
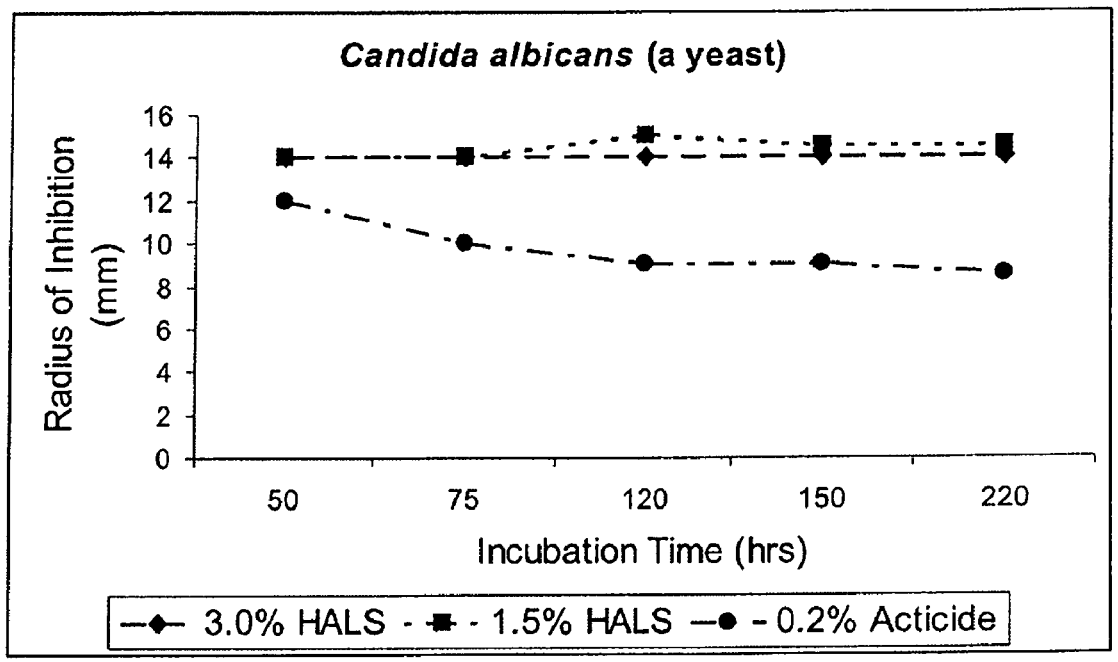
FIG. 2 summarizes the inhibition of *C. albicans* growth by the test paint over a 9 day period. Each data-point of a line represents the mean (average) of two repeats of a test. The amount and type of biocide contained in respective paints is shown in the associated legend.

As shown in FIG. 2, both the 1.5% v/v HALS and the 3% v/v HALS and zinc pyrithione paint showed similar inhibition of *C. albicans*. The control paint containing 0.2% v/v Acticide showed less inhibition of growth than either of the paints containing HALS. The results with *C. albicans* show that 1.5% v/v and 3% v/v HALS and zinc pyrithione had better antimicrobial activity on yeast compared with 0.2% v/v Acticide, the upper limit for Acticide allowed by regulatory authorities.

Figure 3:
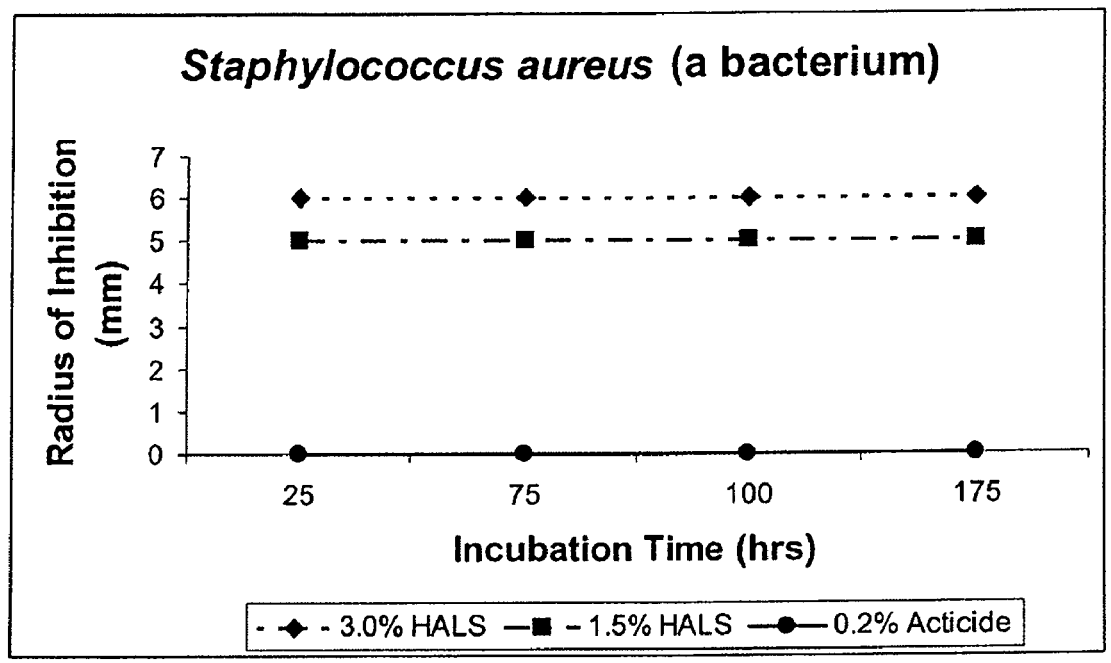
FIG. 3 summarizes the inhibition of *S. aureus* growth by the test paint over a 7 day period. Within FIG. 3, each data-point of a line represents the mean (average) of two repeats of a test. The amount and type of biocide contained in respective paints is shown in the associated legend.
Figure 4:
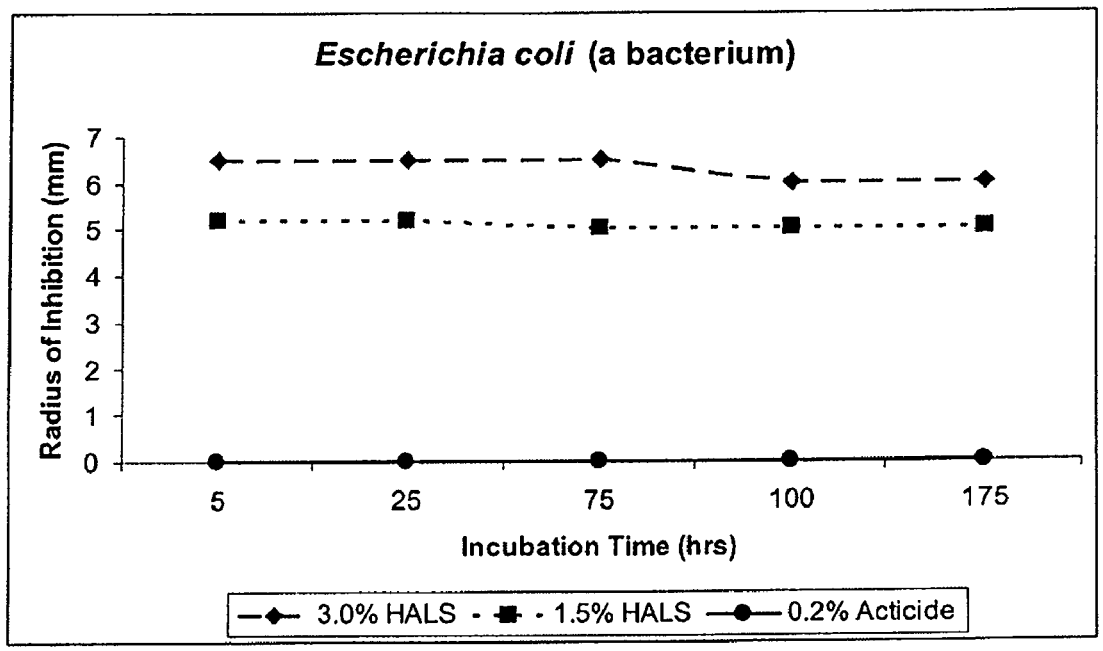
FIG. 4 summarizes the inhibition of *E. coli* growth by the test paint over a 7 day period. Within FIG. 4, each data-point of a line represents the mean (average) of two repeats of a test. The amount and type of biocide contained in respective paints is shown in the associated legend.

As shown in FIGS. 3 and 4, the growth of each of *S. aureus* and *E. Coli* was inhibited by a paint of the invention. Paint containing 3% v/v HALS and zinc pyrithione was found to produce a slightly larger area of growth inhibition of both *S. aureus* and *E. coli* than did the 1.5% v/v HALS and zinc pyrithione paint, but not twice as large. Control paint containing 0.2% v/v Acticide had no effect on these bacteria. The use of HALS and zinc pyrithione in paint is effective for controlling *S. aureus* and *E. coli* growth. Moreover, paints that contain 0.2% Acticide are incapable of controlling these bacteria species.

The paints of the invention may be useful on surfaces of hospitals, kitchens and other areas where hygiene is an issue.

The data shows that application of a paint of the invention will prevent further growth of microbes already present on a surface. No growth of microorganisms was noted under or on any of the painted discs, even though spores or cells had been applied there. Because lawns of microorganisms were used, the tests mimic the real life situation of growths already present on surfaces. When preparing a surface for painting, it is difficult to clean away all spores by physical scrubbing or by the use of bleach or soap and water. To the naked eye the mould may be gone, but at the microscopic level live spores may still be abundant.

Painting over the surface at this stage may only hide the problem temporarily. Curing old infestations that are beneath the fresh paint surface needs to run hand in hand with the prevention of new infestations that arrive. As shown in the tests, the active replenishment of surface zinc pyrithione from beneath the surface of the paint provides a continuous protection against further microbial colonization.

What is claimed is:

1. A water-based antimicrobial paint consisting essentially of:
   (a) a liquid vehicle;
   (b) a total concentration of 5% v/v of one or more hindered amine light stabilizers (HALS) selected from the group consisting of bis( 1,2,2,6,6-pentamethyl-4-piperidinyl) sebacate, bis(1,2,2,6,6-pentamethyl-4-piperidinyl)(3,5-di-tert-butyl-4-hydroxybenzyl)butylpropanedioate) and methyl 1,2,2,6,6-pentamethyl-4-piper-idinyl sebacate; and
   (c) 3% v/v metal pyrithione.

2. The antimicrobial paint of claim 1, wherein the total concentration of HALS is from 0.5% v/v to 5% v/v.

3. The antimicrobial paint of claim 2, wherein the total concentration of HALS is from 1% v/v to 3.5% v/v.

4. The antimicrobial paint of claim 3, wherein the total concentration of HALS is from 1.5% v/v to 3% v/v.

5. The antimicrobial paint of claim 1, wherein the metal pyrithione is zinc pyrithione.

6. A method of manufacturing the water-based antimicrobial paint of claim 1, comprising the step of mixing a total concentration of 5% v/v of one or more hindered amine light stabilizers (HALS) selected from the group consisting of bis(1,2,2,6,6-pentamethyl-4-piperidinyl)sebacate, bis(1,2,2,6,6-pentamethyl-4-piperdinyl)(3,5-di-tert-butyl-4-hydroxybenzyl)butylpropanedioate) and methyl 1,2,2,6,6-pentamethyl-4-piperidinyl sebacate, and 3% v/v metal pyrithione, with a suitable liquid vehicle.

7. The antimicrobial paint of claim 1, wherein the metal pyrithione is from 0.4% v/v to 3% v/v.

8. The antimicrobial paint of claim 1, wherein the metal pyrithione is from 0.5% v/v to 2.5% v/v.

9. The antimicrobial paint of claim 1, wherein the HALS is bis(1,2,2,6,6-pentamethyl-4-piperidinyl)sebacate and methyl 1,2,2,6,6-pentamethyl-4-piper-idinyl sebacate in a ratio of 1:4.

10. The antimicrobial paint of claim 1, wherein the ratio of HALS to metal pyrithione is 1:1.

* * * * *